Aug. 10, 1954  J. WANDSCHEER  2,686,020
BOUNDARY LAYER CONTROL FOR AIRCRAFT
Filed March 16, 1951  2 Sheets-Sheet 1
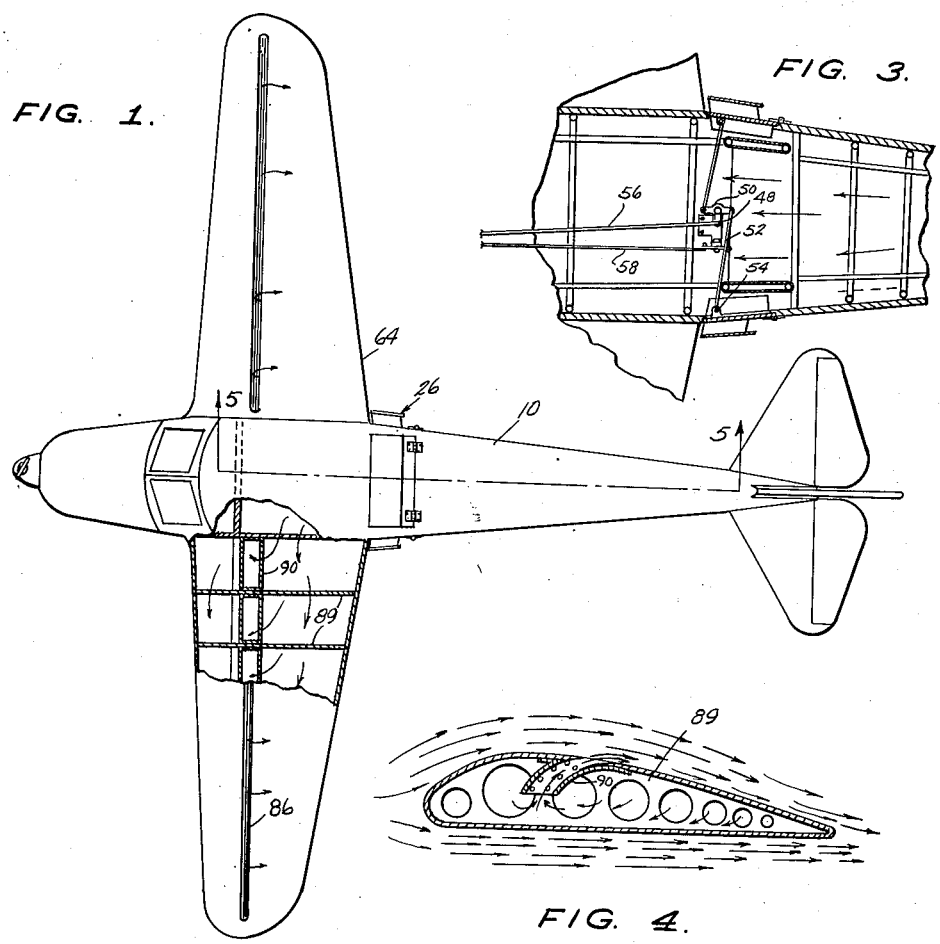
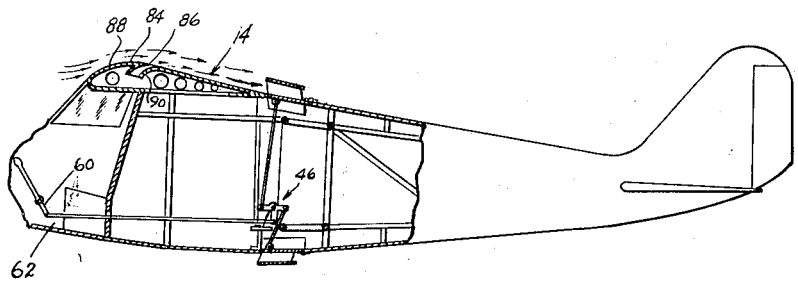
INVENTOR.
JOHN WANDSCHEER,
BY
ATTORNEYS.

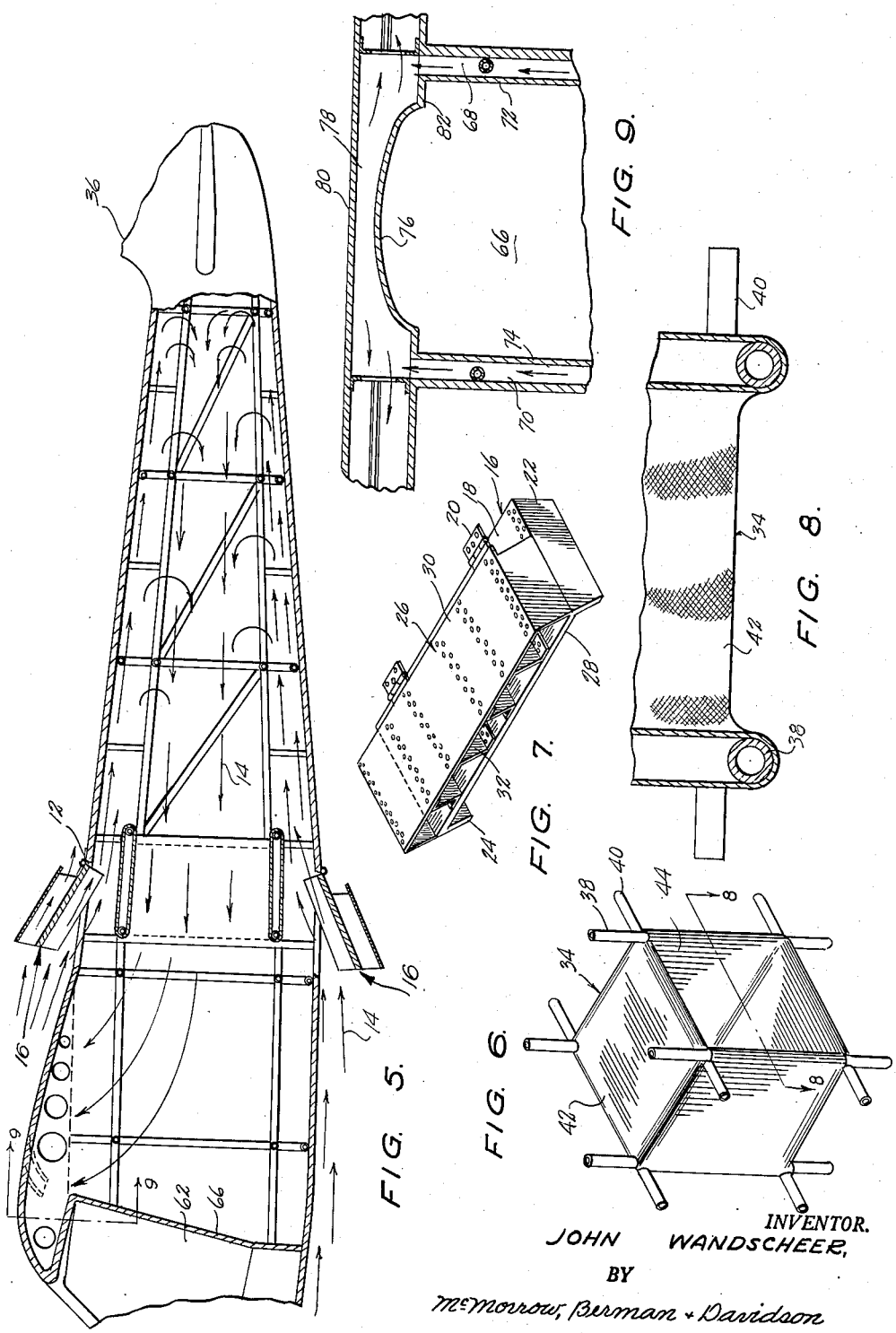

Patented Aug. 10, 1954

2,686,020

UNITED STATES PATENT OFFICE 2,686,020

BOUNDARY LAYER CONTROL FOR AIRCRAFT

John Wandscheer, Sioux Center, Iowa

Application March 16, 1951, Serial No. 215,944

2 Claims. (Cl. 244—40)

This invention appertains to improvements in apparatuses for energizing boundary layer air over the back portion or upper camber of the wing structures of an aircraft and especially relates to the provision of means for the effective distribution of propeller backwash over the back portion of the upper camber of the wing structures.

The primary object of this invention is to effect an increase in the maximum lift of an airplane by lowering relative wind over the back portion of the wing upper surface, when the wing is at a high angle of attack to relative wind. The boundary layer air is energized, in accordance with this invention, by utilizing the propeller backwash or air streams, which air streams are conducted into the fuselage of the airplane and conveyed to the wing structures for effective and fast distribution over the wing top surface, exactly rearwardly of the high point in the wing top surface.

A further object of this invention is to provide means for conducting the propeller backwash or propeller created air streams into the fuselage of an airplane, increasing the air pressure thereby, and conducting the air streams, at a percentage increase in pressure, forwardly in the fuselage to the wing structures, where the air streams are projected out over the upper camber to produce a fast air movement over the secondary airfoil and create a lift over the secondary airfoil, thereby obviating air burbles and causing the primary airfoil to correspondingly react with an increase in its maximum range of lift. Thus, a very high lift factor at a high angle of attack and slow air speed is introduced, without any extensive modification in the conventional structure of the fuselage and wing structures of an airplane.

A further object of this invention is to provide means for enabling an airplane to land and take off at a lower landing and take-off speed and to possess a greater angle of climb and glide. This is effected by increasing the maximum lift of the wing structures, while decreasing the air speed, under the effect of high velocity propeller created air streams over the back portion of the upper surface of the wings, thereby increasing the maximum lift of the wings by increasing the stall or burble angle of the wings. By projecting the propeller backwash, conveyed through the fuselage to the wings, over the back portion of the upper surface of the wings, the relative wind camber is lowered and streamlined, and the high air pressure, existing interiorly of the wing structure, adds to the lift, since at slow air speed the pressure inside the wing structure is higher than the pressure beneath the wing structure.

A still further object of this invention is to provide hinged air scoops, which are arranged around the fuselage rearwardly of the fuselage wing formers, the hinged air scoops being adjustably controlled by remote control means mounted forwardly in the fuselage at the cabin compartment, the air scoops collecting the propeller backwash or air streams for conveying the air streams to the wing structures.

A further object of this invention is to provide conduit or duct means in the fuselage, so that the propeller backwash introduced into the fuselage by the air scoops is conveyed forwardly in the fuselage, at an increase in pressure, to the wing structures.

And yet another object of this invention is to provide openings in the upper surface of the wings, the openings extending the full span of the wings and being formed rearwardly of the high point in the wing top surface for projecting the air streams rearwardly over the airfoil, the air streams being projected and distributed in such a fashion as to follow the contour of the airfoil and create a secondary airfoil.

These and ancillary objects and structural features of merit are attained by this invention, the preferred embodiment of which is set forth in the following description and illustrated in the accompanying drawings, wherein:

Figure 1 is a top plan view of a conventional airplane, modified in accordance with the principles of this invention;

Figure 2 is a side elevational view of the fuselage, with a portion of the fuselage being broken away to illustrate the operating structure for the air scoops and the wing structure;

Figure 3 is an enlarged detail sectional view of the operating means for the air scoops;

Figure 4 is an enlarged transverse sectional view of the wing structure;

Figure 5 is an enlarged longitudinal vertical sectional view taken on line 5—5 of Figure 1;

Figure 6 is a perspective view of the conduit and baffle means, mounted in the fuselage for directing the incoming air streams toward the tail assembly and conveying the air streams to the wing structures;

Figure 7 is a perspective view of one of the air scoops;

Figure 8 is a fragmentary sectional view taken on line 8—8 of Figure 6, and,

Figure 9 is a fragmentary sectional view taken on line 9—9 of Figure 5 and illustrating the conduit means provided for establishing communication between the wing structures and the fuselage.

Referring now more particularly to the accompanying drawings, the fuselage 10 is formed at its sides and top and bottom with openings 12, the openings being arranged rearwardly of the fuselage wing formers and forming conduit means for the air streams 14, which are created by the propeller backwash. Scoops 16 are pivotally attached to the fuselage for pivotal movement about axes transverse to the longitudinal axis of the fuselage and are adjustably controlled by suitable mechanical linkage or other operating means to govern the flow of the air currents into the fuselage.

The scoops 16 include a flat body portion 18, which is of a size and configuration to enclose the openings 12. Hinges 20 are utilized in attaching one side edge of the body portion to the covering for the fuselage and end walls 22 and 24 project upwardly in parallelism from the opposing end edges of the body portion.

A baffle structure 26 is formed on the outer surface of the body portion 18 of each of the scoops 16 and extends from the beveled leading edge 28 of the body portion to a point spaced from the hinged edge. The baffle structure extends the full length of the body portion 18 and functions to maintain full rudder and elevator control, when the air scoops are in an open position, as depicted in Figure 5. When the air scoops are closed, as illustrated in Figure 2, the baffle structures are parallel to the sides of the fuselage and to the flow of the prop wash, so that a very infinitesimal amount of drag is produced by the baffles. The baffle structure 26 includes a plate 30, which is spaced from the body portion 18 of the scoops and overlies the body portion in parallelism, the plate 30 being fixed to the body portion 18 of each scoop by spaced reinforcing rib members 32.

A baffle 34 is fixedly mounted in the fuselage and is positioned in spaced opposing relation to the openings 12, so that the baffle confronts the incoming air currents 14 to deflect the air currents from the path assumed by the inclined positions of the air scoops into a straight path relative to the tail assembly 36 of the airplane. The baffle 34 is formed from a plurality of connected aluminum tubes 38, the tubes being assembled in box-like formation and having their ends crossed and secured together, so that the ends 40 of the tubes are used as anchoring means for fixing the baffle in the fuselage. The tubes are covered with fabric covering 42, the covering defining closed side walls and top and bottom walls and, since the opposing ends are open, the covering defines a longitudinally disposed duct or conduit 44, which is axially disposed within the fuselage.

The air scoops 16 on each side of the fuselage are simultaneously operated, so that the prop wash is conducted into the fuselage from all sides of the fuselage and an even air flow is maintained. An operating linkage 46 is provided for effecting a simultaneous and effective operation of the air scoops, the operating linkage including a mounting member 48, which is disposed, in any suitable manner, within the fuselage and on which bellcranks 50 are pivotally disposed. Links 52 are pivoted to the bellcranks and to ears 54, which are formed on the inner surface of the body portion 18 of each air scoop. The upper and lower air scoops are simultaneously operated by a rod 56, which is connected to the bellcrank 50, the crank 50 moving about a horizontal axis and the scoops in the opposing sides of the fuselage are simultaneously opened and closed by an operating rod 58, which is connected to the bellcrank 50 for the scoops, the latter bellcrank pivoting about a vertical axis. The rods 56 and 58 are commonly anchored to one end of a pivoted operating lever 60, which is suitably mounted in the cabin compartment 62 of the fuselage and is disposed in a zone of convenience for the pilot of the aircraft.

The air scoops 16 are simultaneously operated by means of the foregoing mechanical linkage, under the manual operation of the lever 60 and, when in an open position, form baffles to deflect the prop wash from its normal path encompassing the fuselage interiorly of the fuselage. The incoming air currents 14, created by the propeller, are deflected by the sides of the duct 44, so that the air currents move rearwardly in the fuselage toward the tail assembly 36. The air currents 14 are, therefore, effectively directed in their flow towards the rear of the fuselage and a considerable air pressure is built up in the rear part of the fuselage. The air currents 14 are then conveyed by the duct 44 toward the wing structure 64. The back wall 66 of the cabin compartment 62 forms a baffle, which is transversely disposed in the forward path of movement of the air stream and the air stream is deflected laterally of the fuselage into side ducts 68 and 70, which establish a path of communication between the fuselage and the wing structure 64. The ducts 68 and 70 are defined by the opposing sides of the fuselage and by walls 72 and 74, which are spaced from the sides of the fuselage and disposed in confronting relation thereto. The top 76 of the cabin compartment is slightly modified, as seen in Figure 9, so that a channel 78 is provided, whereby the air stream is communicated with the interior of the wings. In this respect, the top 80 of the fuselage is normally in immediate adjacency to the top 76 of the cabin compartment but, to provide the channel-way 78, the side edges 82 of the top 76 of the cabin compartment are lowered.

Rearwardly of the high point 84 of each of the wings of the wing structures 64, a continuous opening or slot 86 is formed, the opening extending the full span of the wings and being directed toward the upper camber of the wing. The slots 86 in each of the wings of the wing structures 64 are located directly rearwardly of the high point 84 in the wing top camber 86, so that the air stream 14 is directed over the back portion of the upper surface of the wings. The air stream 14 is conducted by the duct 44 through the ducts 68 and 70 and the channel-way 78 to the interior of the wings, the air currents moving through the apertured wing ribs 89 and being projected through the slots 86 rearwardly of the high point of the wing airfoil. The slots 86 are communicated with curved channels 90, formed from aluminum sheeting, the channels 90 being connected to and interposed between the spaced wing ribs 89, as seen in Figure 1.

When the air scoops are disposed in open positions, the scoops are positioned transverse to the flow path of the propeller back wash and the air stream 14 is deflected from its normal path by the scoops and conveyed inwardly of the fuselage. The air pressure is built up in the fuselage, at the region of the tail assembly, and the high air pressure is conducted through the duct 44 and distributed along the wing slots 86 through the ducts or channels 90. At the point of distribution, the high air pressure causes a high velocity air flow over the back portion of the upper camber of the wings, the air currents streamlining and following the contour of the back portion of the wings, irrespective of the angle of attack of the wings and within the path of the relative air flow.

During take-offs, the air scoops 16 are open to their approximate full open positions and the engine is revolved at full throttle, the resulting prop wash being conveyed, as aforestated, to the back portion of the upper surface of the wings. The distribution of the propeller air stream over the wings and the existence in the aircraft structure of the high air pressure results in a maximum lift exertion on the wings and, accordingly, take-offs can be accomplished under a short take-off run and at sharp angles of climb.

During landing operations, the air scoops are opened and the engine is throttled at medium throttle for a sharp angle of glide, the air scoops and resultant distribution of the propeller air stream over the back portion of the upper camber of the wings compensating for the throttle reduction of the engine in maintaining a constant lift, under the sharp angle of attack.

In normal flight, the air scoops are closed and, when the air scoops are closed, the scoops and slots 86 have no effect on the performance of the aircraft. The air scoops do not produce any air resistance or drag and, only when the air scoops are open, under normal level flight conditions, do they cause a small amount of drag in transferring the propeller air stream to the wing slots. The existence of the slots and the distribution of the prop wash over the upper camber of the wings have little effect on the normal flight of the aircraft.

It has been found that an airplane, equipped with the means for distributing the prop wash over the rear portion of the upper surface of the wings and operated, in accordance with the foregoing method of operation, will have a lower landing and take-off speed but possess a greater angle of climb and glide. This is realized by lowering the minimum flying speed of the aircraft, since the maximum lift of the wing is increased by the distribution of the propeller air streams over the rear portion of the upper surface of the wings. The maximum lift of the wings is effectively increased by increasing the stall or burble, under the high velocity propeller air stream, which follows the line of and moves across the airfoil at the rear portion of the upper surface of the wings, along the entire span thereof. The distribution of the high velocity propeller backwash over the upper camber of the wings eliminates air burbles and streamlines and lowers the relative wind camber, while adding to the lift. Obviously, the pressure inside the wing structure will be higher than the pressure under the wing and the difference in pressure will effect a greater lift action of the wings. In operation, with the wings at a high angle of attack, such as 20 to 30°, the drag is considerably increased and the considerable percentage increase in drag plus the air scoop drag, encountered by the air resistance in distributing the propeller air stream over the upper surface of the wings, will act as a counterbalance to the propeller thrust and maintain the airplane at a gliding air speed considerably lower than that of conventional airplanes, even with the engine running at normal R. P. M. and the plane in a landing operation.

Having thus described this invention, what is claimed is:

1. In a propeller driven aircraft having a fuselage and wings, said wings having an upwardly cambered top surface, means for distributing the propeller air streams directly over the back portion of the upper surface of the wings comprising, in combination, air scoops hingedly mounted on the sides of the fuselage, baffle means mounted in the fuselage for directing the air stream deflected by the scoops into the fuselage and rearwardly thereof, conduit means defined by said baffle means for conducting the air streams forwardly toward and into the wings, said wings having slots formed in their upper surface rearwardly of the high point thereof for exhausting the air streams over the back portion of the upper surface of the wings, said baffle means including a box-like fabric covered frame having open end walls facing the front and back of the fuselage, said frame having closed sides opposing the scoops in spaced relation thereto.

2. In a propeller driven aircraft having a fuselage and wings, said wings having an upwardly cambered top surface, means for distributing the propeller air streams directly over the back portion of the upper surface of the wings comprising, in combination, air scoops hingedly mounted on the sides of the fuselage, baffle means mounted in the fuselage for directing the air stream deflected by the scoops into the fuselage and rearwardly thereof, conduit means defined by said baffle means for conducting the air streams forwardly toward and into the wings, said wings having slots formed in their upper surface rearwardly of the high point thereof for exhausting the air streams over the back portion of the upper surface of the wings, said baffle means including a box-like frame having open end walls facing the front and back of the fuselage, said frame having closed sides opposing the scoops in spaced relation thereto.

References Cited in the file of this patent

UNITED STATES PATENTS

| Number | Name | Date |
|---|---|---|
| 1,427,872 | Verville | Sept. 5, 1922 |
| 1,782,210 | Nose | Nov. 18, 1930 |
| 2,084,464 | Stalker | June 22, 1937 |
| 2,168,166 | Larrecq | Aug. 1, 1939 |
| 2,171,047 | Richardson et al. | Aug. 29, 1939 |
| 2,453,721 | Mercier | Nov. 16, 1948 |
| 2,568,813 | Lundberg | Sept. 25, 1951 |

FOREIGN PATENTS

| Number | Country | Date |
|---|---|---|
| 479,598 | Great Britain | Feb. 7, 1938 |